United States Patent
Matsunaga et al.

(10) Patent No.: US 8,006,483 B2
(45) Date of Patent: Aug. 30, 2011

(54) EXHAUST EMISSION PURIFYING APPARATUS FOR ENGINE

(75) Inventors: Hideki Matsunaga, Saitama (JP); Toshikazu Katou, Saitama (JP); Hiroyuki Kurita, Saitama (JP); Shinji Kumazawa, Aichi (JP); Masayuki Motomura, Aichi (JP); Katsunori Yazawa, Aichi (JP)

(73) Assignees: Nissan Diesel Motor Co., Ltd., Ageo-shi (JP); NGK Spark Plug Co., Ltd., Nagoya-shi (JP)

( * ) Notice: Subject to any disclaimer, the term of this patent is extended or adjusted under 35 U.S.C. 154(b) by 338 days.

(21) Appl. No.: 12/411,891

(22) Filed: Mar. 26, 2009

(65) Prior Publication Data

US 2010/0086446 A1 Apr. 8, 2010

Related U.S. Application Data

(63) Continuation of application No. PCT/JP2007/067599, filed on Sep. 10, 2007.

(30) Foreign Application Priority Data

Sep. 26, 2006 (JP) ................................ 2006-261079

(51) Int. Cl.
F01N 3/00 (2006.01)
(52) U.S. Cl. ................ 60/286; 60/277; 60/295; 60/301; 60/303; 701/104; 701/107
(58) Field of Classification Search .................... 60/276, 60/277, 286, 295, 297, 301, 303; 701/104, 701/107
See application file for complete search history.

(56) References Cited

U.S. PATENT DOCUMENTS

| | | | | |
|---|---|---|---|---|
| 6,063,350 | A * | 5/2000 | Tarabulski et al. | 423/239.1 |
| 6,167,698 | B1 * | 1/2001 | King et al. | 60/286 |
| 7,017,335 | B2 * | 3/2006 | Huber et al. | 60/286 |
| 7,178,328 | B2 * | 2/2007 | Solbrig | 60/286 |
| 7,610,750 | B2 * | 11/2009 | Viola et al. | 60/286 |
| 7,784,272 | B2 * | 8/2010 | Song et al. | 60/286 |
| 7,832,200 | B2 * | 11/2010 | Kesse et al. | 60/286 |
| 2005/0251318 | A1 | 11/2005 | Wickert et al. | |
| 2007/0240405 | A1 | 10/2007 | Nishina et al. | |

FOREIGN PATENT DOCUMENTS

EP 1860294 A1 11/2007

(Continued)

OTHER PUBLICATIONS

Extended European Search Report for EP 07807009.1 (related application), mailed Dec. 12, 2009.

(Continued)

Primary Examiner — Binh Q. Tran
(74) Attorney, Agent, or Firm — Baker & Hostetler LLP (57) ABSTRACT

In an exhaust emission purifying apparatus for reductively purifying NOx in the exhaust emission by using a liquid reducing agent or its precursor, to be referred to as "liquid reducing agent" herein, a dosing flow rate of the liquid reducing agent according to engine operating conditions is computed, and the dosing of the liquid reducing agent is controlled based on the computed dosing flow rate, and also, it is judged whether or not a supply system of the liquid reducing agent is failed, based on a ratio between an integrated amount obtained by sequentially integrating the dosing flow rate and a consumed amount of the liquid reducing agent.

17 Claims, 9 Drawing Sheets

FOREIGN PATENT DOCUMENTS

| | | |
|---|---|---|
| JP | 2000328930 A | 11/2000 |
| JP | 2002-038928 A | 2/2002 |
| JP | 2003343240 A | 12/2003 |
| JP | 2005054723 A | 3/2005 |
| JP | 2005113763 A | 4/2005 |
| JP | 2005133541 A | 5/2005 |
| JP | 3686672 B1 | 8/2005 |
| JP | 2006090334 A | 4/2006 |
| JP | 2006112274 A | 4/2006 |
| JP | 2006132442 A | 5/2006 |
| JP | 2006250117 A | 9/2006 |

OTHER PUBLICATIONS

Chinese Office Action for related Chinese Application No. 200780035519.1 (dated Aug. 18, 2010).

* cited by examiner

FIG. 9

EXHAUST EMISSION PURIFYING APPARATUS FOR ENGINE

CROSS-REFERENCE TO RELATED APPLICATIONS

This application is a continuation of PCT/JP2007/067599, filed on Sep. 10, 2007 and entitled "Engine Exhaust Purifying Apparatus," which claims priority to Japanese Patent Application No. 2006-261079, filed on Sep. 26, 2006, the disclosures of which are incorporated herein by reference in their entirety.

FIELD OF THE INVENTION

The present invention relates to a technology for performing a comprehensive failure diagnosis on a supply system of a liquid reducing agent or its precursor in an engine exhaust emission purifying apparatus for reductively purifying nitrogen oxides ($NO_x$) in the exhaust emission (to be referred to as an exhaust emission purifying apparatus).

BACKGROUND OF THE INVENTION

There have been proposed various exhaust emission purifying apparatuses in each of which a liquid reducing agent or its precursor is injection-supplied to an exhaust emission upstream side of a $NO_x$ reduction catalytic converter disposed in an engine exhaust system, so that $NO_x$ in the exhaust emission and the reducing agent are subjected to the catalytic-reduction reaction, to thereby reductively purify $NO_x$ into harmless components. In the exhaust emission purifying apparatus, when an injection nozzle which injection-supplies the liquid reducing agent or its precursor is clogged, since an appropriate amount of reducing agent is not supplied to the NOx reduction catalytic converter, a function as the exhaust emission purifying apparatus cannot be achieved. Therefore, as disclosed in Japanese Laid-Open (Kokai) Patent Application Publication No. 2006-132442 (Patent literature 1), there has been proposed a technology for indirectly judging whether or not the injection nozzle is clogged, based on various types of parameters.

However, as factors that the appropriate amount of reducing agent is not supplied to the $NO_x$ reduction catalytic converter, there can be assumed various factors, for example, not only clogging of the injection nozzle but also clogging or cracks of piping, a failure in an electronic control system or the like. Therefore, a technology for performing not only the clogging judgment of the injection nozzle but also the comprehensive failure diagnosis on a supply system of the liquid reducing agent or its precursor is necessary.

SUMMARY OF THE INVENTION

Consequently, in view of the above conventional problems, focusing on that there is a correlation between a consumed amount of the liquid reducing agent or its precursor and an integrated amount obtained by sequentially integrating a control value (a dosing flow rate), the present invention has an object to provide an exhaust emission purifying apparatus capable of performing the comprehensive failure diagnosis on the supply system of the liquid reducing agent or its precursor.

Therefore, an exhaust emission purifying apparatus in accordance with the present invention includes: a reduction catalytic converter reductively purifying $NO_x$ in the exhaust emission by using a reducing agent; a reducing agent tank storing a liquid reducing agent or its precursor; a reducing agent dosing device that doses the liquid reducing agent or its precursor stored in the reducing agent tank to the exhaust emission upstream side of the reduction catalytic converter; a level measuring device that measures the level of the liquid reducing agent or its precursor stored in the reducing agent tank; and a control unit incorporating therein a computer. Then, the control unit executes: a dosing flow rate computing process of computing a dosing flow rate of the liquid reducing agent or its precursor according to engine operating conditions; a reducing agent dosing process of controlling the reducing agent dosing device, based on the dosing flow rate computed in the dosing flow rate computing process; an integrated amount computing process of computing an integrated amount obtained by sequentially integrating the dosing flow rate computed in the dosing flow rate computing process; a consumed amount computing process of computing a consumed amount of the liquid reducing agent or its precursor, based on the level measured by the level measuring device; and a failure judging process of judging whether or not a supply system of the liquid reducing agent or its precursor is failed, based on a ratio between the integrated amount computed in the integrated amount computing process and the consumed amount computed in the consumed amount computing process.

By virtue of the exhaust emission purifying apparatus according to the present invention, the integrated amount obtained by sequentially integrating the dosing flow rate of the liquid reducing agent or its precursor according to the engine operating conditions, is computed, and also, the consumed amount is computed based on the level of the liquid reducing agent or its precursor stored in the reducing agent tank. Then, it is judged whether or not the supply system of the liquid reducing agent or its precursor is failed, based on the ratio between the integrated amount and the consumed amount. Namely, when the practically consumed amount is considerably smaller or larger than the integrated amount which is deemed to be consumed in control, it can be judged that some kind of failure occurs in the supply system of the liquid reducing agent or its precursor. Therefore, it is possible to perform the comprehensive failure diagnosis on the supply system of the liquid reducing agent or its precursor, for example, not only clogging of the injection nozzle but also clogging or cracks of piping, a failure in an electronic control system or the like.

DETAILED DESCRIPTION

Hereunder is a detailed description of the present invention referring to the accompanying drawings.

Figure 1:
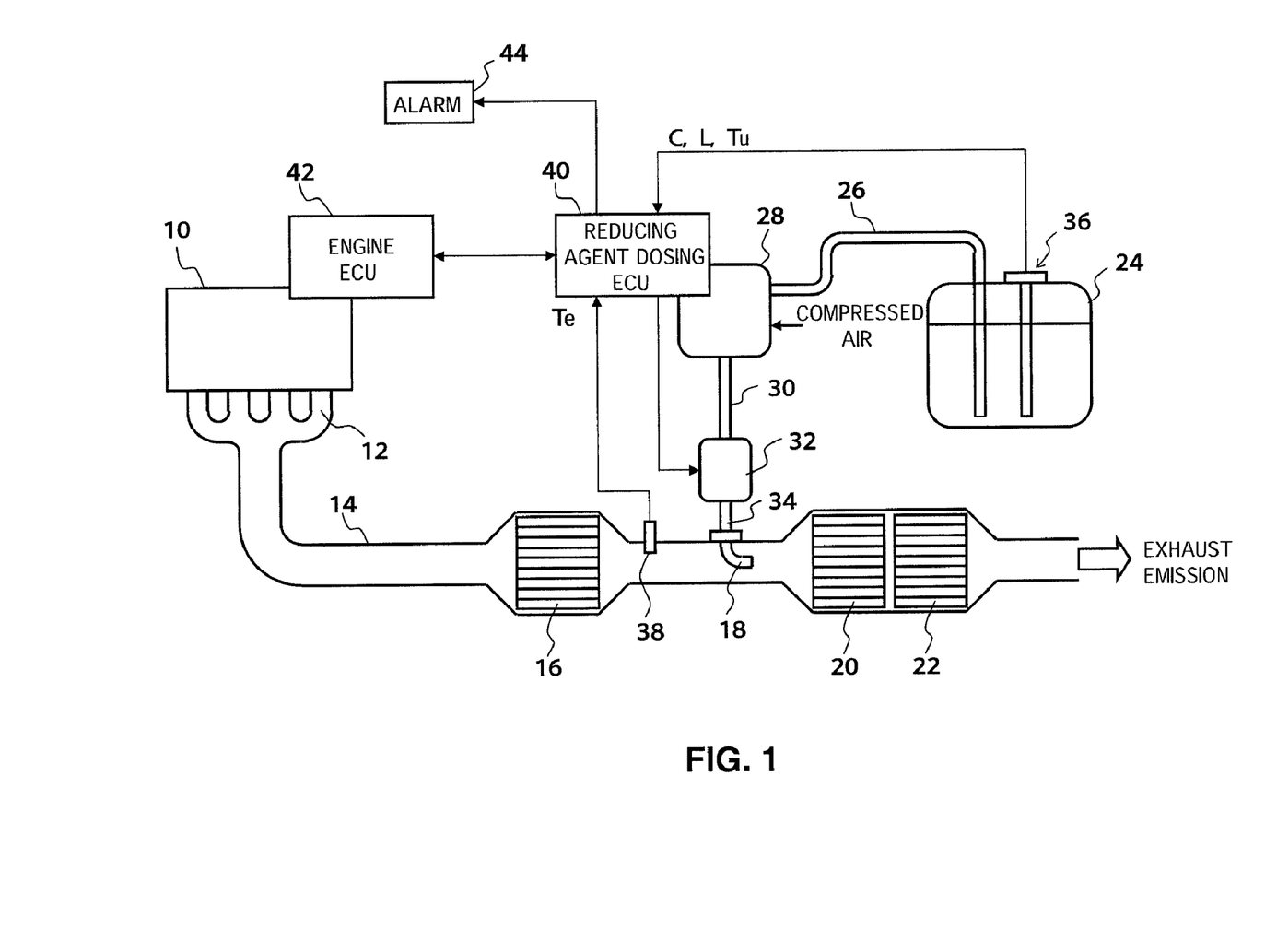
FIG. 1 is a view illustrating a structural constitution of one example of an exhaust emission purifying apparatus according to the present invention.

FIG. 1 illustrates an entire configuration of an exhaust emission purifying apparatus for reductively purifying $NO_x$ in the engine exhaust emission by using the urea aqueous solution which is precursor of a liquid reducing agent.

In an exhaust pipe 14 connected to an exhaust manifold 12 of an engine 10, there are disposed, along a flow direction of the exhaust emission in the order, a nitrogen oxidation catalytic converter 16 which oxidizes nitrogen monoxide (NO) into nitrogen dioxide ($NO_2$), an injection nozzle 18 which injection-supplies the urea aqueous solution, a $NO_x$ reduction catalytic converter 20 which reductively purifies $NO_x$ using ammonia obtained by hydrolyzing the urea aqueous solution, and an ammonia oxidation catalytic converter 22 which oxidizes ammonia passed through the $NO_x$ reduction catalytic converter 20.

A reducing agent tank 24 storing the urea aqueous solution is communicatively connected to a pump module 28 that sucks the urea aqueous solution to pressure-feed it, via a suction hose 26 of which suction port opens at a bottom portion of the reducing agent tank 24. The pump module 28 is communicatively connected to a dosing module 32 that controls a dosing flow rate of the urea aqueous solution, via a pressure hose 30. The dosing module 32 is communicatively connected to the injection nozzle 18, via a dosing hose 34. Here, a reducing agent dosing device is configured by at least the injection nozzle 18, the suction hose 26, the pump module 28, the pressure hose 30, the dosing module 32 and the dosing hose 34. Incidentally, the reducing agent dosing device is not limited to the above-mentioned configuration, and a device which does not use the compressed air, a device in which the dosing module 32 is directly attached to the exhaust pipe 14, a device which does not use the injection nozzle 18, or the like may be used as the reducing agent dosing device.

Figure 2:
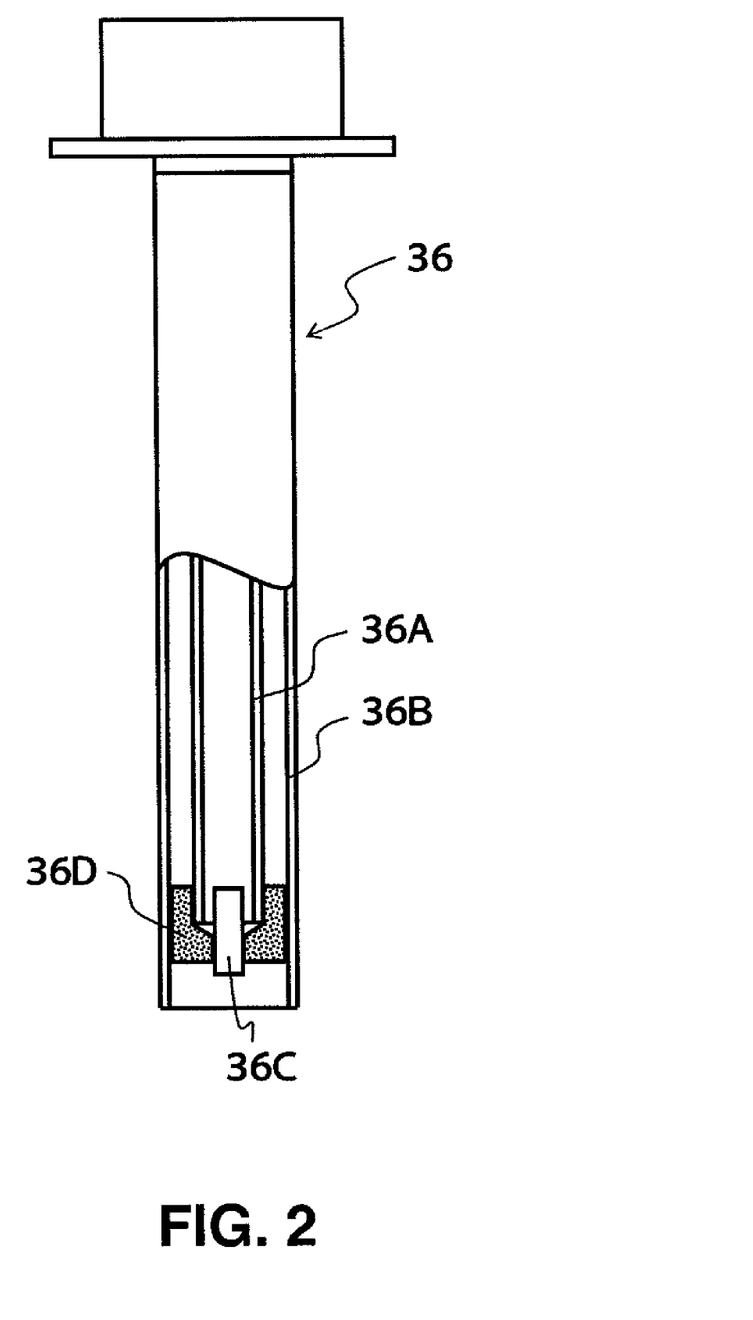
FIG. 2 is an explanatory view of a sensor for measuring the level of the urea aqueous solution and the concentration thereof.
Figure 3:
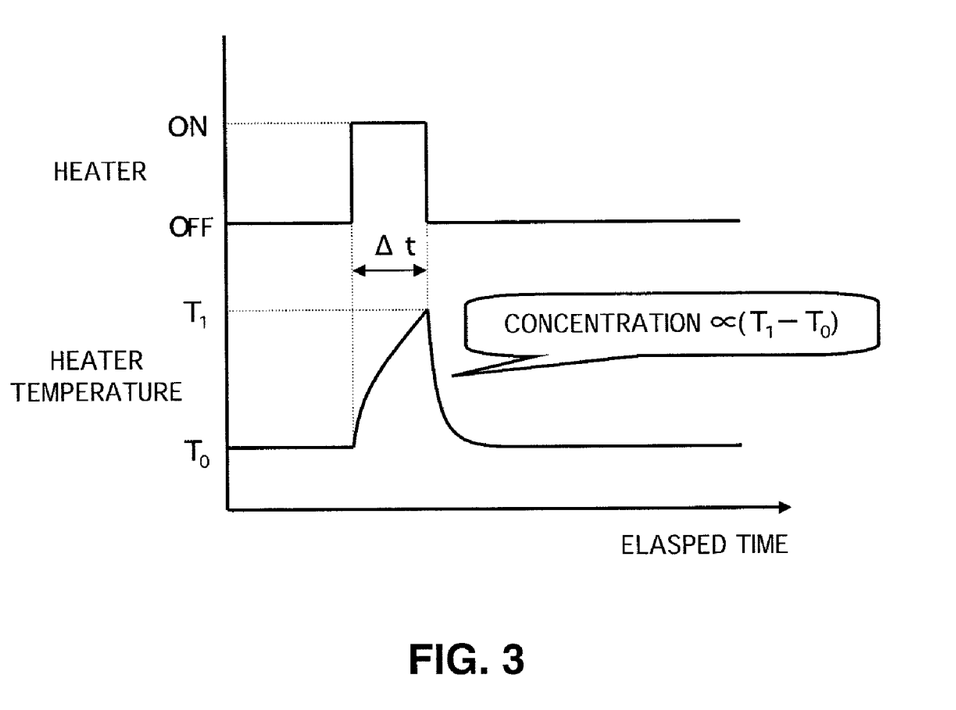
FIG. 3 is an explanatory view of a measuring principle of the urea aqueous solution concentration.

To the reducing agent tank 24, a sensor 36 (level measuring device) for measuring the level L and the concentration C of the urea aqueous solution is attached. As illustrated in FIG. 2, the sensor 36 is configured such that an inner electrode 36A and an outer electrode 36B each of which cross section is an annular shape, are hanged in concentric from a top wall of the reducing agent tank 24 toward a bottom wall thereof, to indirectly measure the level L based on a change in electrostatic capacity between both of the electrodes. Further, the sensor 36 is configured such that a ceramics heater 36C which also serves as a temperature sensor is fixed to tip end portions of the inner electrode 36A and the outer electrode 36B, to indirectly measure the concentration C, based on temperature rise characteristics ($T_1-T_0$) for when the ceramics heater 36 is operated for a predetermined time as shown in FIG. 3, that is, based on heat discharge characteristics for when the urea aqueous solution is used as a heat transfer medium. Furthermore, the sensor 36 measures the temperature Tu of the urea aqueous solution by the use of the temperature sensor thereof. Incidentally, the reference sign 36D in the FIG. 2 is a holder for keeping an approximately constant space between the inner electrode 36A and the outer electrode 36B while fixing the ceramics heater 36C.

To the exhaust pipe 14 positioned between the nitrogen oxidation catalytic converter 16 and the injection nozzle 18, an exhaust emission temperature sensor 38 for measuring the exhaust emission temperature Te is attached. Respective output signals from the sensor 36 and the exhaust emission temperature sensor 38 are input to a reducing agent dosing control unit (to be referred to as a reducing agent dosing ECU hereunder) 40 incorporating therein a computer. Further, to the reducing agent dosing ECU 40, engine operating conditions such as a rotation speed of the engine, and an ignition switch signal, are input from an engine control unit (to be referred to as an engine ECU hereunder) 42 that performs various controls of the engine 10, via a network such as CAN (Controller Area Network). Then, in the reducing agent dosing ECU 40, a control program stored in a ROM (Read Only Memory) or the like thereof is executed, so that both the pump module 28 and the dosing module 32 are electronically controlled, and also, the comprehensive failure diagnosis is performed on a supply system of the urea aqueous solution. Further, according to a diagnosis result, an alarm 44 such as a warning lamp and a buzzer is appropriately controlled. At this time, the reducing agent dosing ECU 40 controls each of the pump module 28 and the dosing module 32, based on a control value (dosing flow rate) computed based on the engine operating conditions including at least the exhaust emission temperature Te.

Here, the control program is executed by the reducing agent dosing ECU 40, so that there are executed a dosing flow rate computing process, a reducing agent dosing process, an integrated amount computing process, a consumed amount computing process, a failure judging process, a correction amount computing process, a consumed amount correcting process, an initial level setting process, first to third resetting processes, an empty judging process, a notifying process, a writing process and a reading process. Incidentally, if the control value representing the dosing flow rate of the urea aqueous solution can be input, the control program may be executed not only in the reducing agent dosing ECU 40 but also in the engine ECU 42 or other ECU.

In the exhaust emission purifying apparatus described above, the urea aqueous solution injection-supplied from the injection nozzle 18 according to the engine operating conditions is hydrolyzed by the exhaust heat and the water vapor in the exhaust emission, to be converted into ammonia functioning as the reducing agent. It is known that the converted ammonia reductively reacts with $NO_x$ in the exhaust emission in the $NO_x$ reduction catalytic converter 20 to be converted into water ($H_2O$) and nitrogen ($N_2$). At this time, in order to improve $NO_x$ purifying performance in the $NO_x$ reduction catalytic converter 20, NO is oxidized to $NO_2$ by the nitrogen oxidation catalytic converter 16, and a ratio between NO and $NO_2$ in the exhaust emission is improved to be appropriate for the reduction reaction. On the other hand, ammonia passed through the $NO_x$ reduction catalytic converter 20 is oxidized by the ammonia oxidation catalytic converter 22 disposed on the exhaust emission downstream side of the $NO_x$ reduction catalytic converter 20, and therefore, ammonia is prevented from being directly discharged into atmosphere.

Next, there will be described the control program performing the failure diagnosis on the supply system of the urea aqueous solution.

Figure 4:
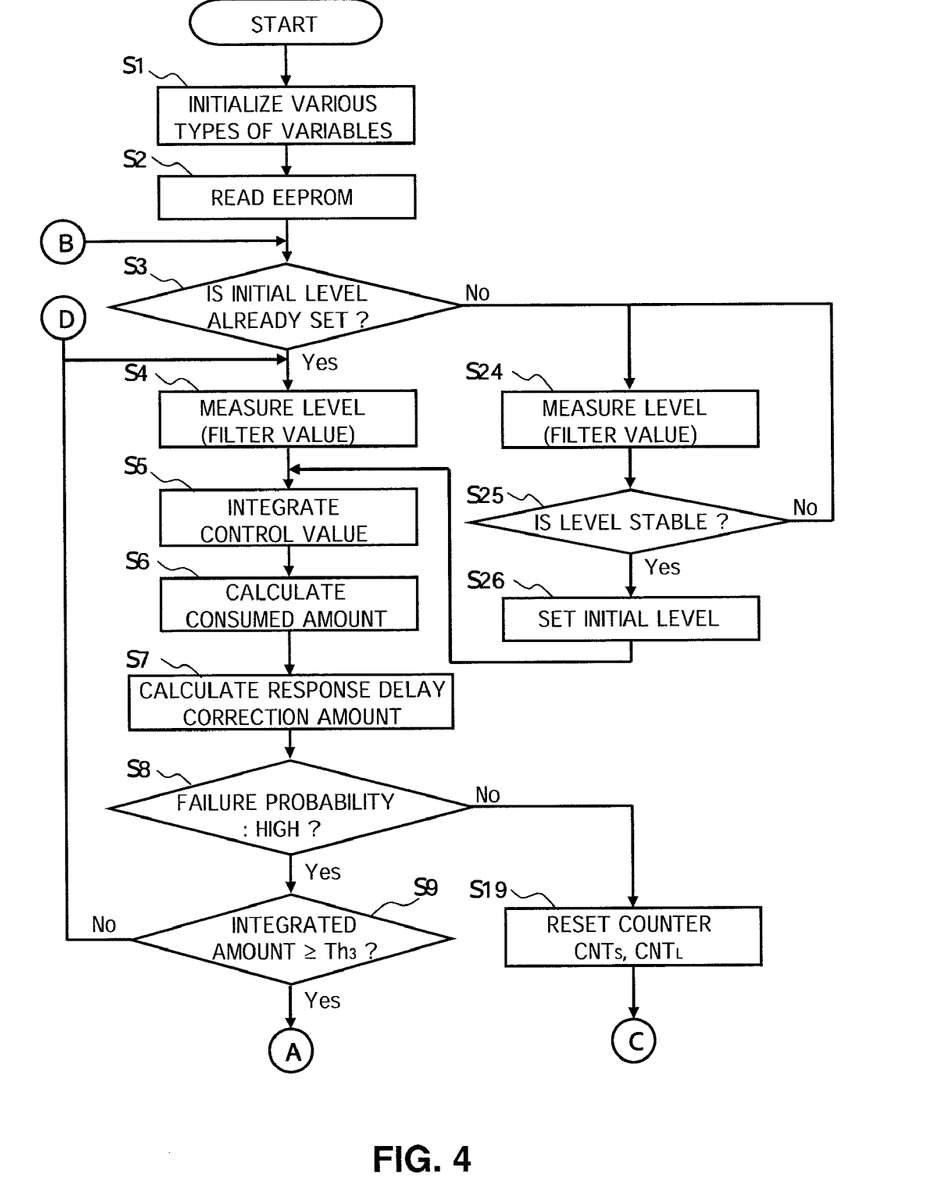
FIG. 4 is a flowchart of a failure diagnosis program executed when an engine operation is started.
Figure 5:
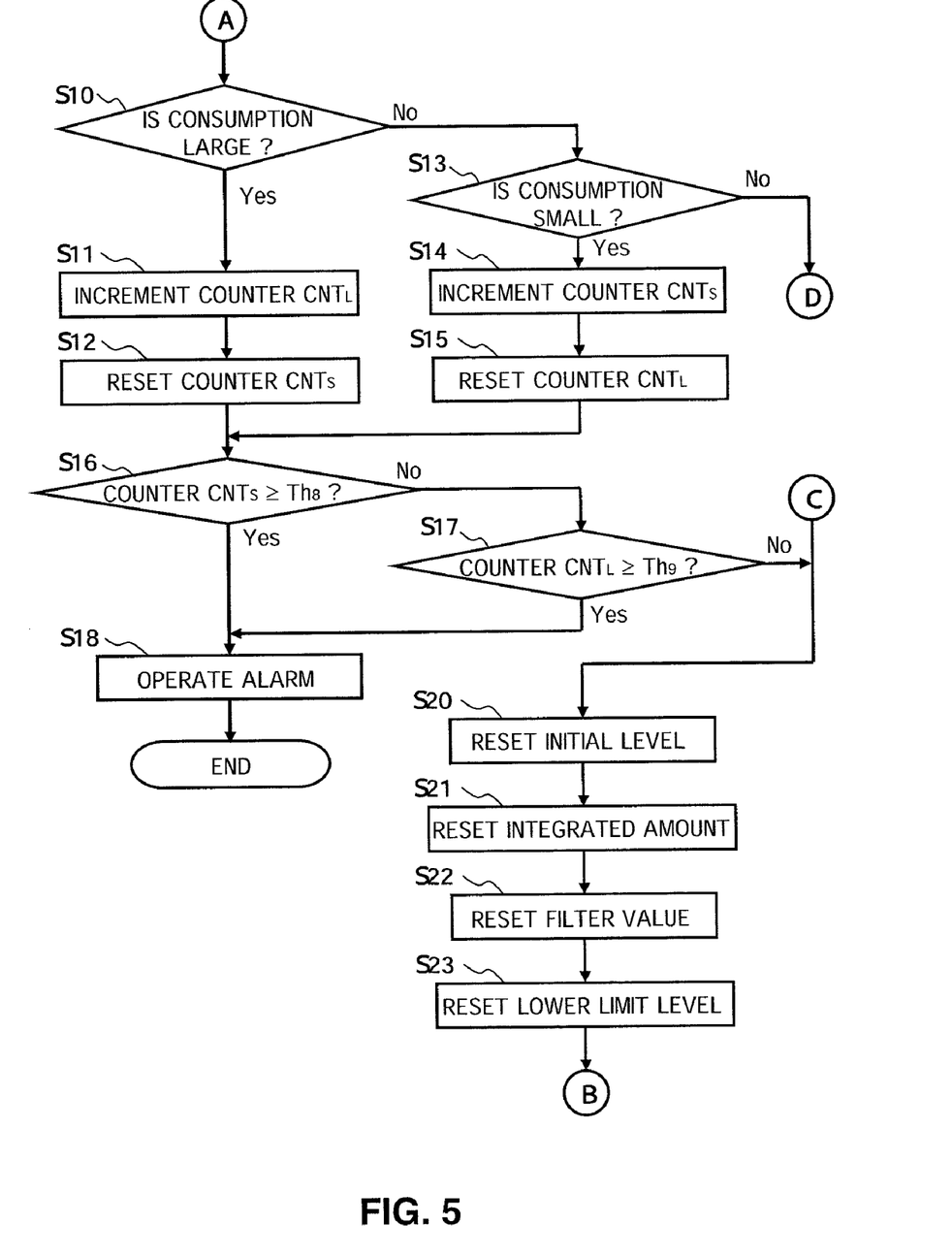
FIG. 5 is a flowchart continued from the flowchart of FIG. 4 of the failure diagnosis program executed when the engine operation is started.

FIGS. 4 and 5 illustrate a failure diagnosis program executed in the reducing agent dosing ECU 40 when an engine operation is started.

In step 1 (to be abbreviated as S1 in the drawing, and the same rule will be applied to the subsequent steps), various types of variables are initialized. To be specific, an integrated amount Sum obtained by sequentially integrating the control value representing the dosing flow rate of the urea aqueous solution, and an output value (to be referred to as a filter value hereunder) $FLT_t$ (t: time constant) obtained by applying a filter of predetermined time constant to the level L read from the sensor 36, are each reset.

Figure 6:
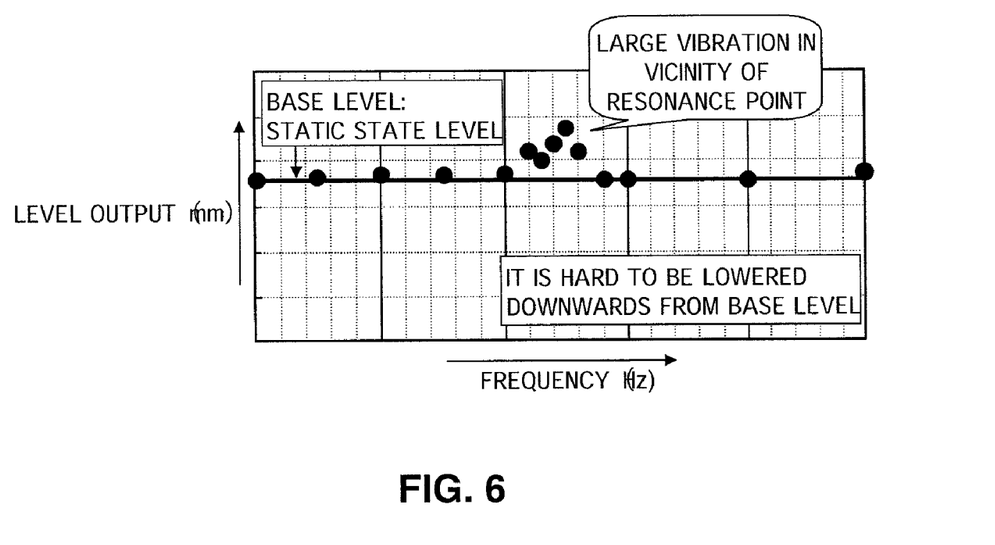
FIG. 6 is a characteristic explanatory view of fluid level swaying.
Figure 7:
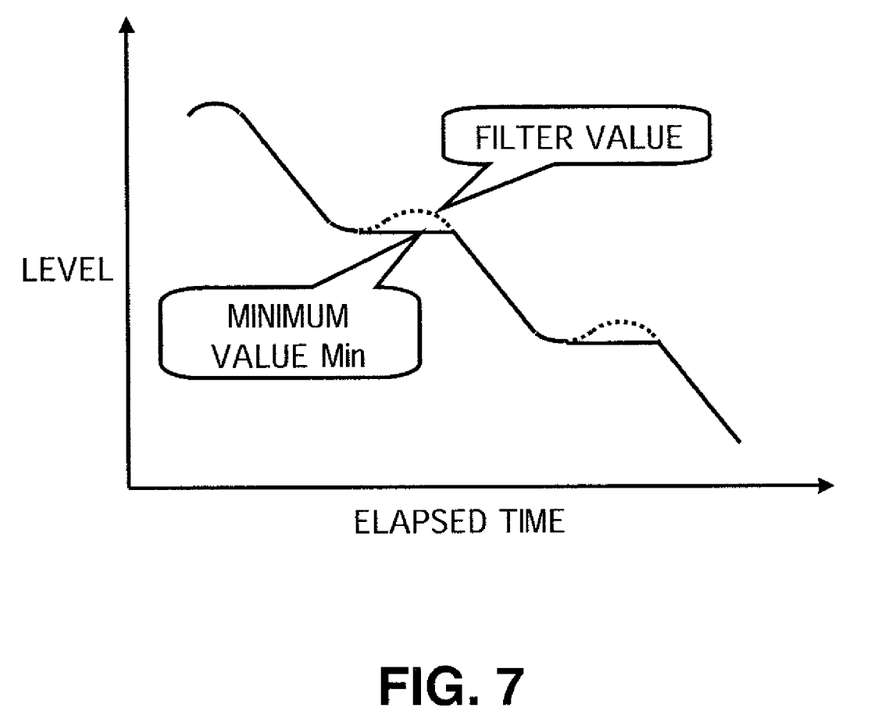
FIG. 7 is an explanatory view of a specifying method of the lower limit level.

In step 2, the initial level $L_{INI}$ written in the previous failure diagnosis, an initial integrated amount $Sum_{INI}$, a counter $CNT_S$, a counter $CNT_L$ and the lower limit level $L_{LOW}$ are read from a nonvolatile memory such as EEPROM (Electrically Erasable Programmable Read Only Memory). Here, the initial level $L_{INI}$ is the level of the urea aqueous solution when the failure diagnosis is started, the initial integrated amount $Sum_{INI}$ is a final integrated amount integrated in the previous failure diagnosis, and the counters $CNT_S$ and $CNT_L$ are counters for counting the number of times at which the consumption of the urea aqueous solution is consecutively judged as "small" or "large". In view of a phenomenon that the fluid level of the urea aqueous solution sways largely upwards while swaying small downwards as illustrated in FIG. 6, the lower limit level $L_{LOW}$ holds a minimum value of the filter value obtained by applying the filter of predetermined time constant as illustrated by a solid line in FIG. 7. To be specific, the lower limit level $L_{LOW}$ is obtained such that the filter value and the minimum value for when the level L is measured are compared with each other, and when the filter value is smaller than the minimum value, the minimum value is successively updated by the filter value. Incidentally, when the initial level $L_{INI}$ is not yet set, a value thereof is set at 0.

In step 3, it is judged whether or not the initial level $L_{INI}$ is already set, namely, whether or not a value other than 0 is set as the initial level $L_{INI}$. Then, when the initial level $L_{INI}$ is already set (Yes), the routine proceeds to step 4, whereas when the initial level $L_{INI}$ is not yet set (No), the routine proceeds to step 24 for setting the initial level $L_{INI}$.

In step 4, various types of filter values $FLT_t$ obtained by applying each filter of different time constants to the level L read from the sensor 36 are calculated, and also, the lower limit level $L_{LOW}$ is updated if required. Here, as time constants, it is possible to adopt several seconds, several ten seconds, several hundred seconds and the like, according to sampling intervals of the level L. Incidentally, in the followings, for description convenience, the filter values $FLT_t$ obtained by applying filters of several seconds time constant, several ten seconds time constant and several hundred seconds time constant are represented by $FLT_S$, $FLT_M$ and $FLT_L$.

In step 5, the control value representing the dosing flow rate of the urea aqueous solution is sequentially integrated in accordance with the following formula.

Integrated amount Sum=integrated amount Sum+control value

In step 6, practically consumed amounts $Con_1$ and $Con_2$ of the urea aqueous solution are each calculated in accordance with the following formulas. Note, S in the following formulas is a conversion constant uniquely determined based on a cross sectional area of the reducing agent tank 24 or the like, for converting the level into volume.

Consumed amount $Con_1$=(initial level $L_{INI}$−filter value $FLT_L$)×conversion constant $S$ Consumed amount $Con_2$=(initial level $L_{INI}$−lower limit level $L_{LOW}$)×conversion constant $S$ In step 7, since a temporal change in the consumed amount $Con_1$ is suppressed by the filter value $FLT_L$, considering a possibility that the consumed amount $Con_1$ includes an error of delay in response to practical level changes with the consumption of the urea aqueous solution, a correction amount C or for correcting the error is calculated. To be specific, in order to correct the delay in response based on time-series change characteristics (inclination) of the integrated amount Sum, the filter of time constant same as that used when the consumed amount $Con_1$ is calculated is applied to a moving average of the control values of predetermined numbers, to thereby calculate the correction amount Cor.

In step 8, it is judged whether or not there is high probability that the supply system of the urea aqueous solution is failed. To be specific, it is judged whether or not a condition of [(consumed amount $Con_1$+correction amount Cor$\geqq$threshold $Th_1$ or consumed amount $Con_2$$\geqq$threshold $Th_1$) and (initial integrated amount $Sum_{INI}$+integrated amount Sum>threshold $Th_2$)] is established. Here, the thresholds $Th_1$ and $Th_2$ are each set at values each capable of achieving a ratio of the consumed amount to the integrated amount when the supply system of the urea aqueous solution is normally operated. Then, when the probability of failure occurrence is high (Yes), the routine proceeds to step 9, whereas when the probability of failure occurrence is low (No), the routine proceeds to step 19.

In step 9, it is judged whether or not the integrated amount Sum is equal to or larger than a threshold $Th_3$ (second predetermined value). Here, the threshold $Th_3$ defines a failure diagnosis performing condition, and is set at several hundred ml for example, considering a possibility that when the integrated amount Sum is small, a relative error is large, and accordingly, the precise failure diagnosis may not be performed. Then, when the integrated amount Sum is equal to or larger than the threshold $Th_3$ (Yes), the routine proceeds to step 10, whereas when the integrated amount Sum is smaller than the threshold $Th_3$ (No), the routine returns to step 4.

In step 10, it is judged, based on the ratio between the integrated amount and the consumed amount, whether or not some kind of failure occurs in the supply system of the urea aqueous solution, and thus, "consumption is large" in which the consumed amount is abnormally larger than the integrated amount. To be specific, it is judged whether or not a condition of [(initial integrated amount $Sum_{INI}$+integrated amount Sum$\leqq$threshold $Th_4$) and (consumed amount $Con_1$$\geqq$threshold $Th_5$) and (consumed amount $Con_2$$\geqq$threshold $Th_5$)] is established, namely, a condition in that although the integrated amount is equal to or smaller than the threshold $Th_4$, the consumed amount is equal to or larger than the threshold $Th_5$ is established. Here, the thresholds $Th_4$ and $Th_5$ are thresholds each for judging whether or not the consumed amount is abnormally larger than the integrated amount, and are each set at values defining the ratio between the integrated amount and the consumed amount. Then, when "the consumption is large" (Yes), the routine proceeds to step 11, whereas when "the consumption is not large" (No), the routine proceeds to step 13.

In step 11, the counter $CNT_L$ is incremented.

In step 12, since it is judged that "the consumption is large", it is judged that probability of "the consumption is small" is extremely low, and the counter $CNT_S$ is reset in view of the improvement of diagnosis precision.

In step 13, it is judged, based on the ratio between the integrated amount and the consumed amount, whether or not some kind of failure occurs in the supply system of the urea aqueous solution, and thus, "the consumption is small" in which the consumed amount is abnormally smaller than the integrated amount. To be specific, it is judged whether or not a condition of [(initial integrated amount $Sum_{INI}$+integrated amount Sum$\geqq$threshold $Th_6$) and (consumed amount $Con_1$+correction amount Cor<threshold $Th_7$) and (consumed amount $Con_2$<threshold $Th_7$)] is established, namely, a condition in that although the integrated amount is equal to or larger than the threshold $Th_6$, the consumed amount is smaller than the threshold $Th_7$ is established. Here, the thresholds $Th_6$ and $Th_7$ are thresholds each for judging whether or not the consumed amount is abnormally smaller than the integrated amount, and are each set at values defining the ratio between the integrated amount and the consumed amount. Then, when "the consumption is small" (Yes), the routine proceeds to step 14, whereas when "the consumption is not small" (No), the routine returns to step 4.

In step 14, the counter $CNT_S$ is incremented.

In step 15, since it is judged that "the consumption is small", it is judged that probability of "the consumption is large" is extremely low, and the counter $CNT_L$ is reset in view of the improvement of diagnosis precision.

In step 16, it is judged whether or not the counter $CNT_S$ is equal to or larger than a threshold $Th_8$. Here, the threshold $Th_8$ is for, even if it is erroneously judged that "the consumption is small" due to noise superposition or the like, holding such judgment indeterminate unless such judgment is consecutively made for a predetermined number of times, to thereby improve the failure diagnosis precision, and is set at about several times for example. Then, when the counter $CNT_S$ is equal to or larger than the threshold $Th_8$ (Yes), the routine proceeds to step 18, whereas when the counter $CNT_S$ is smaller than the threshold $Th_8$ (No), the routine proceeds to step 17.

In step 17, it is judged whether or not the counter $CNT_L$ is equal to or larger than a threshold $Th_9$. Here, the threshold $Th_9$ is for, even if it is erroneously judged that "the consumption is large" due to noise superposition or the like, holding such judgment indeterminate unless such judgment is consecutively made for predetermined number of times, to thereby improve the failure diagnosis precision, and is set at about several times for example. Incidentally, the threshold $Th_9$ can be set at a value same as the threshold $Th_8$ or a value different from the threshold $Th_8$. Then, when the counter $CNT_L$ is equal to or larger than the threshold $Th_9$ (Yes), the routine proceeds to step 18, whereas when the counter $CNT_L$ is smaller than the threshold $Th_9$ (No), the routine proceeds to step 20.

In step 18, the alarm 44 is operated in order to notify that the supply system of the urea aqueous solution is failed, and thereafter, the routine is terminated.

In step 19, the counters $CNT_S$ and $CNT_L$ are each reset.

In step 20, the initial level $L_{INI}$ is reset.

In step 21, the integrated amount Sum is reset.

In step 22, the filter values $FLT_S$, $FLT_M$ and $FLT_L$ are each reset.

In step 23, the lower limit level $L_{LOW}$ is reset, and thereafter, the routine returns to step 3.

In step 24, in accordance with a process similar to that in step 4, the filter values $FLT_S$, $FLT_M$ and $FLT_L$ are each calculated based on the level L read from the sensor 36.

In step 25, it is judged whether or not the level of the urea aqueous solution stored in the reducing agent tank 24 is stable. To be specific, it is judged whether or not a condition of [(|filter value $FLT_S$–filter value $FLT_L$|≦threshold $Th_{10}$) and (|filter value $FLT_M$–filter value $FLT_L$|≦threshold $Th_{10}$)] continues to be established for a predetermined time (a first predetermined time) or longer. Here, the threshold $Th_{10}$ (a first predetermined value) is for judging whether or not the level of the urea aqueous solution is stable, namely, for judging whether the fluid level sway is large or small, and is set at abound several mm for example. Then, when the level of the urea aqueous solution is stable (Yes), the routine proceeds to step 26, whereas when the level of the urea aqueous solution is unstable (No), the routine returns to step 24.

In step 26, the filter value $FLT_L$ is set to the initial level $L_{INI}$, and thereafter, the routine proceeds to step 5.

According to the failure diagnosis process described above, the control value (the dosing flow rate of the urea aqueous solution) according to the engine operating conditions is sequentially integrated, so that the integrated amount Sum deemed to be consumed in control is computed. Further, the filter value $FLT_L$ obtained by applying the filter of several hundred seconds time constant to the level L read from the sensor 36 is subtracted from the initial level $L_{INI}$ of the urea aqueous solution in the reducing agent tank 24, so that the consumed amount $Con_1$ in which a variation due to the liquid level sway of the urea aqueous solution is suppressed, is computed. Further, the filter value $FLT_M$ obtained by applying the filter of several ten seconds time constant to the level L is subtracted from the initial level $L_{INI}$, so that the consumed amount $Con_2$ considering fluid level sway characteristics is computed while suppressing the variation due to the fluid level sway of the urea aqueous solution. Here, the initial level $L_{INI}$ is set only under conditions that the level is stable, such as, at vehicle stopping during which the running vibration is low in a moving vehicle, and therefore, the fluid level sway of the urea aqueous solution is eliminated as much as possible.

Then, it is judged, based on a ratio between an integrated amount (to be referred to as "a Total integrated amount" hereunder) obtained by adding the integrated amount Sum to the initial integrated amount $Sum_{INI}$, and the consumed amounts $Con_1$ and $Con_2$, whether or not the supply system of the urea aqueous solution is failed. To be specific, when the ratio of the consumed amounts $Con_1$ and $Con_2$ to the Total integrated amount is deviated from a predetermined range defined by an upper limit threshold for judging that the consumption of the urea aqueous solution is abnormally large and a lower limit threshold for judging that the consumption thereof is abnormally small, it is judged that the supply system of the urea aqueous solution is failed. At this time, since it is also judged that the consumption of the urea aqueous solution is abnormally large or abnormally small, it is possible to diagnose not only that the supply system of the urea aqueous solution is failed but also what failure occurs.

Consequently, it is possible to perform the comprehensive failure diagnosis on the supply system of the urea aqueous solution, such as not only clogging of the injection nozzle 18 but also clogging or cracks of piping, a failure in an electronic control system, fixing of a flow control valve incorporated in the dosing module 32 and the like.

At this time, since, taking the delay in response into consideration, the consumed amount $Con_1$ is corrected with the correction amount Cor according to the time-series change characteristics of the integrated amount Sum, the computation precision degradation caused by the delay in response can be suppressed, to thereby improve the failure diagnosis precision. Here, the correction amount Cor is computed by applying the filter of several hundred seconds time constant to the moving average of the control values of predetermined numbers, and therefore, the complicated computation does not need to be performed and an increase of control load can be suppressed. Further, since it is judged whether or not the supply system of the urea aqueous solution is failed only when the integrated amount Sum is equal to or larger than the predetermined value (threshold $Th_3$), it is possible to inhibit the failure judgment under a state where a difference of the integrated amount Sum from the consumed amount is small and therefore a relative error becomes easily large, to thereby suppress the erroneous diagnosis. Further, when the probability of failure occurrence is low, since the failure diagnosis starts to be performed for over again, it is possible to improve the reliability of the failure diagnosis.

On the other hand, even if it is judged that the supply system of the urea aqueous solution is failed, such judgment is held indeterminate unless this judgment is consecutively made for the predetermined number of times, and therefore, it is possible to suppress the erroneous diagnosis due to noise superposition or the like. Then, when the failure judgment of the supply system of the urea aqueous solution is determined, since the alarm 44 is operated, the failure occurrence can be recognized, and by performing appropriate processes such as checking, repairing and the like, a function as the exhaust emission purifying apparatus can be achieved.

Figure 8:
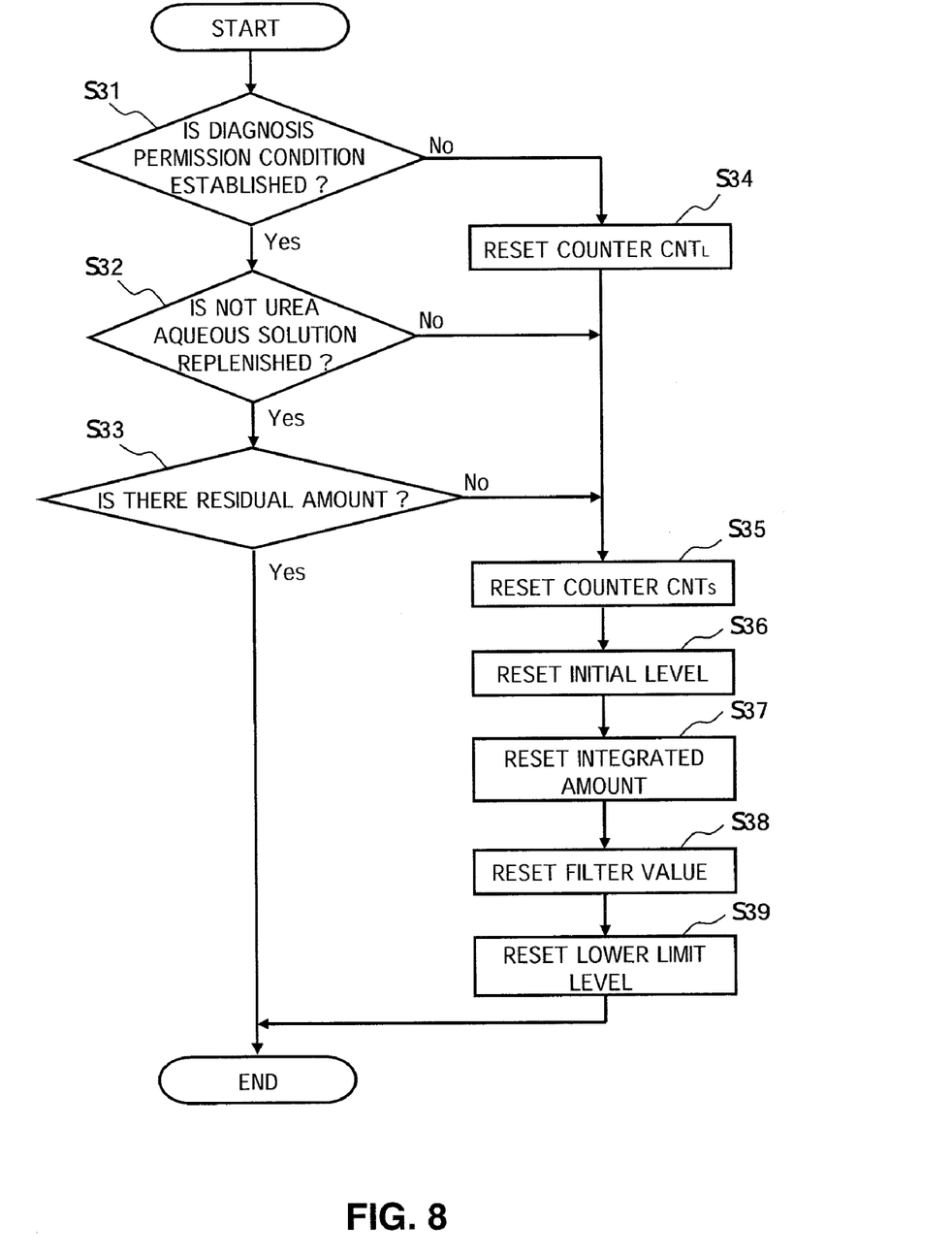
FIG. 8 is a flowchart of a diagnosis permission program executed when the engine operation is started.

FIG. 8 illustrates a diagnosis permission program repetitively executed at each predetermined time in the reducing agent dosing ECU 40 in parallel to the process illustrated in FIG. 4 and FIG. 5, when the engine operation is started.

In step 31, it is judged whether or not a diagnosis permission condition is established. Here, as the diagnosis permission condition, it is possible to adopt, for example, whether or not the temperature Tu of the urea aqueous solution is equal to or higher than a freezing point, considering a possibility that, when the temperature Tu of the urea aqueous solution stored in the reducing agent tank 24 is low, since the urea aqueous solution is frozen or is in a sherbet state, the injection-supply thereof is hard to be performed. Incidentally, the temperature Tu of the urea aqueous solution may be measured using a temperature sensor function of the sensor 36. Then, when the diagnosis permission condition is established (Yes), the routine proceeds to step 32, whereas when the diagnosis permission condition is not established (No), the routine proceeds to step 34 where the counter $CNT_L$ is reset.

In step 32, it is judged whether or not the urea aqueous solution is not replenished. To be specific, it is judged whether or not a condition of [filter value $FLT_M$-lower level $L_{LOW} \geq$ threshold $Th_{11}$] is consecutively established for a predetermined time (a second predetermined time) or longer. Here, the threshold $Th_{11}$ (a third predetermined value) is for judging whether or not the level rises as a result that the urea aqueous solution is replenished, and is set at about 10 mm to 20 mm for example. Then, when the urea aqueous solution is not replenished (Yes), the routine proceeds to step 33, whereas when the urea aqueous solution is replenished (No), the routine proceeds to step 35.

In step 33, it is judged, based on the level L read from the sensor 36, whether or not a residual amount of the urea aqueous solution is equal to or larger than a threshold $Th_{12}$ (a fourth predetermined value). Here, the threshold $Th_{12}$ is for judging whether or not the reducing agent tank 24 is empty or the residual amount of the urea aqueous solution is little, and is appropriately set according to level measuring capability of the sensor 36 for example. Then, when the residual amount of the urea aqueous solution is equal to or larger than the threshold $Th_{12}$ (Yes), the routine is terminated, whereas when the residual amount of the urea aqueous solution is smaller than the threshold $Th_{12}$ (No), the routine proceeds to step 35.

In step 35, the counter $CNT_S$ is reset.

In step 36, the initial level $L_{INI}$ is reset.

In step 37, the integrated amount Sum is reset.

In step 38, the filter values $FLT_S$, $FLT_M$ and $FLT_L$ are each reset.

In step 39, the lower limit level $L_{LOW}$ is reset.

According to the diagnosis permission process described above, when the temperature Tu of the urea aqueous solution stored in the reducing agent tank 24 is lower than the predetermined temperature (freezing point), the integrated amount Sum and the initial level $L_{INI}$ being reference for computing the consumed amounts $Con_1$ and $Con_2$ are each reset, and the failure diagnosis starts to be performed for over again. Therefore, the failure diagnosis is not performed in the state where the injection-supply is hard to be performed since the urea aqueous solution is frozen or is in the sherbet state, and consequently, it is possible to suppress the erroneous diagnosis such that the failure occurrence is judged although any failure does not occur in the supply system.

Further, when the urea aqueous solution is replenished or the reducing agent tank 24 becomes empty, since the probability that "the consumption is small" in which the urea aqueous solution is abnormally small is extremely low, the failure diagnosis starts to be performed for over again, while holding only the counter $CNT_L$ counting the number of times when the judgment of "the consumption is large" is made. Therefore, the possibility that the judgment of "the consumption is small" is erroneously made is reduced, and consequently, the failure diagnosis precision can be improved.

Figure 9:
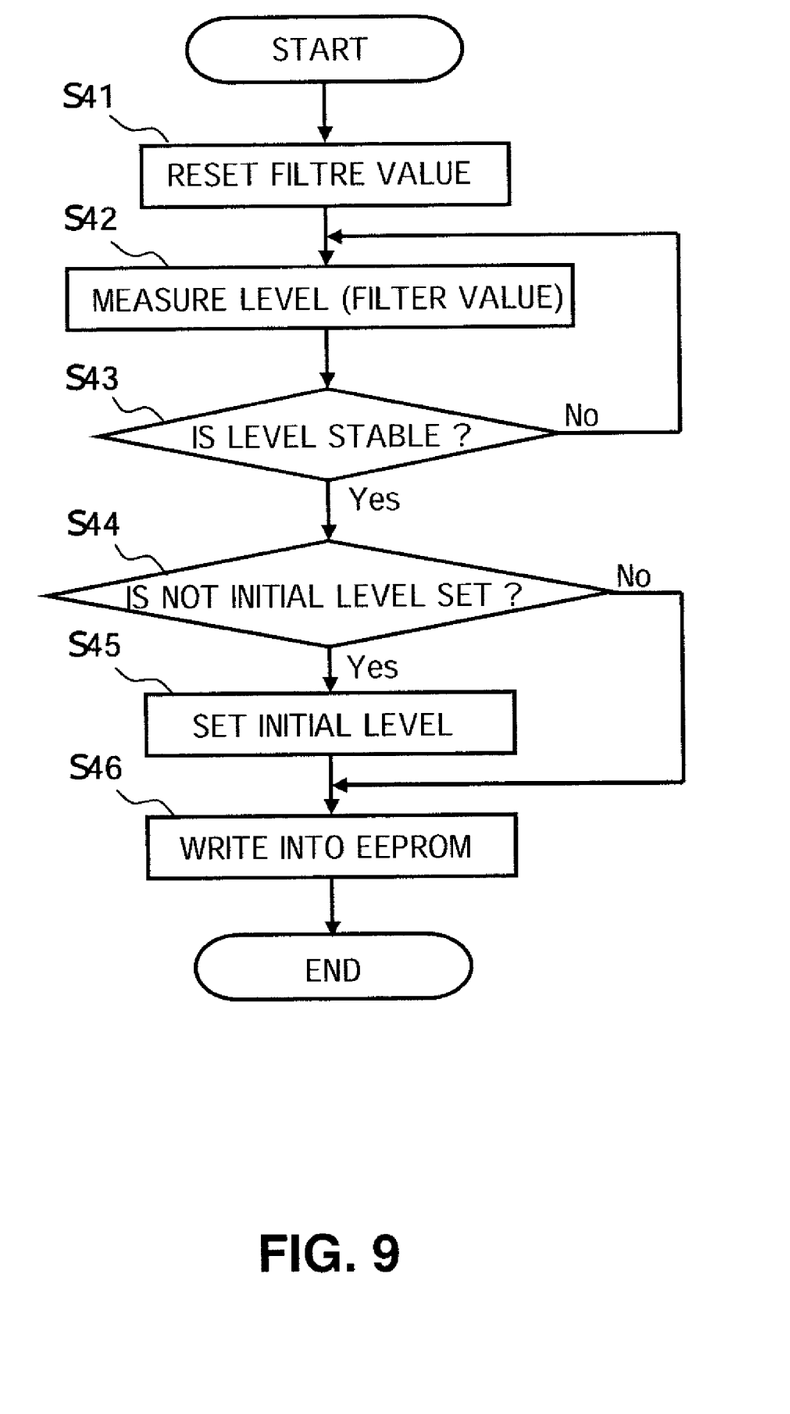
FIG. 9 is a flowchart of an information writing program executed when the engine operation is stopped.

FIG. 9 illustrates an information writing program executed in the reducing agent dosing ECU 40 when the engine operation is stopped.

In step 41, the filter values $FLT_S$, $FLT_M$ and $FLT_L$ are each reset.

In step 42, in accordance with a process similar to that in step 4, the filter values $FLT_S$, $FLT_M$ and $FLT_L$ are each calculated based on the level L read from the sensor 36.

In step 43, in accordance with a process similar to that in step 25, it is judged whether or not the level of the urea aqueous solution stored in the reducing agent tank 24 is stable. Then, when the level of the urea aqueous solution is stable (Yes), the routine proceeds to step 44, whereas when the level of the urea aqueous solution is unstable (No), the routine returns to step 42.

In step 44, it is judged whether or not the initial level $L_{INI}$ is not yet set. Then, when the initial level $L_{INI}$ is not yet set (Yes), the routine proceeds to step 45 where the filter value $FLT_L$ is set to the initial level $L_{INI}$. On the other hand, when the initial level $L_{INI}$ is already set (No), the routine proceeds to step 46.

In step 46, the integrated amount Sum is set to the initial integrated amount $Sum_{INI}$, and thereafter, the initial level $L_{INI}$, the initial integrated amount $Sum_{INI}$, the counter $CNT_S$, the counter $CNT_L$ and the lower limit level $L_{LOW}$ are each written to EEPROM.

According to the information writing process described above, when the engine operation is stopped, the initial level $L_{INI}$ of the urea aqueous solution and the lower limit level $L_{LOW}$ thereof are set under the condition that the level of the urea aqueous solution stored in the reducing agent tank 24 is stable. Further, the integrated amount Sum is set to the initial integrated amount $Sum_{INI}$, and thereafter, the initial level $L_{INI}$, the initial integrated amount $Sum_{INI}$, the counter $CNT_S$, the counter $CNT_L$ and the lower limit level $L_{LOW}$ are each written to EEPROM. Therefore, in the failure diagnosis process executed when the engine operation is started, since the consumed amounts $Con_1$ and $Con_2$ are computed based on the initial level $L_{INI}$ and the lower limit level $L_{LOW}$, the failure diagnosis can start to be performed immediately after the engine operation is started. Further, since the initial integrated amount $Sum_{INI}$, the counter $CNT_S$, the counter $CNT_L$ and the lower limit level $L_{LOW}$ are taken over to the next failure diagnosis, the failure diagnosis does not need to start to be performed for over again at each time when the engine 10 starts to be operated, and consequently, the failure diagnosis can be performed in a short time.

Incidentally, in the present embodiment, in order to measure the level L of the urea aqueous solution stored in the reducing agent tank 24 and the temperature Tu thereof, the sensor 36 provided with the level measuring function and the temperature measuring function is used. However, the level L and the temperature Tu may be measured using a well-known level gauge and a well-known temperature sensor.

Further, the present invention can be applied not only to the exhaust emission purifying apparatus using the urea aqueous solution as the liquid reducing agent or its precursor, but also to those apparatuses using light oil, gasoline or kerosene or the like which mainly contain ammonia or hydrocarbon, according to the $NO_x$ reductive-purification reaction in the $NO_x$ reduction catalytic converter.

It should also be understood that many modifications and variations of the described embodiments of the invention will occur to a person having an ordinary skill in the art without departing from the spirit and scope of the present invention as claimed in the appended claims.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. An exhaust emission purifying apparatus for an engine, comprising:
    a reduction catalytic converter that reductively purifies nitrogen oxides in the exhaust emission by using a reducing agent;
    a reducing agent tank that stores a liquid reducing agent or its precursor;
    a reducing agent dosing device that doses the liquid reducing agent or its precursor stored in the reducing agent tank to the exhaust emission upstream side of the reduction catalytic converter;
    a level measuring device that measures a level of the liquid reducing agent or its precursor stored in the reducing agent tank; and
    a control unit, including a computer, to execute:
        a dosing flow rate computing process of computing a dosing flow rate of the liquid reducing agent or its precursor according to engine operating conditions,
        a reducing agent dosing process of controlling the reducing agent dosing device, based on the dosing flow rate computed in the dosing flow rate computing process,
        an integrated amount computing process of computing an integrated amount obtained by sequentially integrating the dosing flow rate computed in the dosing flow rate computing process,
        a consumed amount computing process of computing a consumed amount of the liquid reducing agent or its precursor, based on the level measured by the level measuring device, and
        a failure judging process of judging whether or not a supply system of the liquid reducing agent or its precursor is failed, based on a ratio between the integrated amount computed in the integrated amount computing process and the consumed amount computed in the consumed amount computing process.

2. The apparatus according to claim 1, wherein the failure judging process judges that the supply system of the liquid reducing agent or its precursor is failed, when the ratio of the consumed amount to the integrated amount is deviated from a predetermined range.

3. The apparatus according to claim 2, wherein the failure judging process judges that the failure in the supply system is such that the consumption of the liquid reducing agent or its precursor is abnormally large, when the ratio of the consumed amount to the integrated amount is equal to or higher than an upper limit threshold, and while, judges that the failure in the supply system is such that the consumption of the liquid reducing agent or its precursor is abnormally small, when the ratio of the consumed amount to the integrated amount is equal to or lower than a lower limit threshold.

4. The apparatus according to claim 1, wherein the consumed amount computing process subtracts a filter value obtained by applying a filter of time constant larger than one second to the level measured by the level measuring device, from the initial level of the liquid reducing agent or its precursor in the reducing agent tank, to thereby compute the consumed amount of the liquid reducing agent or its precursor.

5. The apparatus according to claim 4, wherein the control unit further executes:
    a correction amount computing process of computing a correction amount for correcting a delay in response of the consumed amount, based on time-series change characteristics of the integrated amount; and
    a consumed amount correcting process of correcting the consumed amount, based on the correction amount computed in the correction amount computing process.

6. The apparatus according to claim 5, wherein the correction amount computing process computes the correction amount by applying the filter of time constant larger than one second to a moving average of the dosing flow rate.

7. The apparatus according to claim 1, wherein the consumed amount computing process subtracts a minimum value of a filter value obtained by applying a filter of time constant larger than one second to the level measured by the level measuring device, from the initial level of the liquid reducing agent or its precursor in the reducing agent tank, to thereby compute the consumed amount of the liquid reducing agent or its precursor.

8. The apparatus according to claim 4, wherein the control unit further executes, when a state where the filter value obtained by applying the filter of time constant larger than one second to the level measured by the level measuring device is equal to or smaller than a first predetermined value continues for a first predetermined time or longer, an initial level setting process of setting the filter value as the initial level.

9. The apparatus according to claim 8, wherein the initial level setting process sets the initial level when an engine operation is started or stopped.

10. The apparatus according to claim 1, wherein the failure judging process judges whether or not the supply system of the liquid reducing agent or its precursor is failed, only when the integrated amount computed in the integrated amount computing process is equal to or larger than a second predetermined value after an engine operation is started.

11. The apparatus according to claim 1, wherein the control unit further executes a first resetting process of resetting the integrated amount and the consumed amount, when the temperature of the liquid reducing agent or its precursor in the reducing agent tank is lower than the predetermined temperature.

12. The apparatus according to claim 1, wherein the control unit further executes a second resetting process of resetting the integrated amount and the consumed amount, when a state where a value obtained by subtracting a minimum value of a filter value from the filter value obtained by applying a filter of time constant larger than one second to the level measured by the level measuring device is equal to or larger than a third predetermined value continues for a second predetermined time.

13. The apparatus according to claim 1, wherein the control unit further executes:
- an empty judging process of judging whether or not the reducing agent tank which stores the liquid reducing agent or its precursor is empty; and
- a third resetting process of resetting the integrated amount and the consumed amount, when it is judged in the empty judging process that the reducing agent tank which stores the liquid reducing agent or its precursor is empty.

14. The apparatus according to claim 13, wherein the empty judging process judges that the reducing agent tank which stores the liquid reducing agent or its precursor is empty, when the level measured by the level measuring device is lower than a fourth predetermined value.

15. The apparatus according to claim 1, wherein the control unit further executes a notifying process of operating an alarm, when it is judged in the failure judging process that the supply system of the liquid reducing agent or its precursor is failed.

16. The apparatus according to claim 1, wherein the control unit further executes:
- a writing process of writing the integrated amount and the consumed amount into a nonvolatile memory, when an engine operation is stopped; and
- a reading process of reading the integrated amount and the consumed amount from the nonvolatile memory, when the engine operation is started.

17. The apparatus according to claim 1, wherein when the failure judging process consecutively judges for a predetermined number of times that the supply system of the liquid reducing agent or its precursor is failed, the failure judging process determines the judgment.

* * * * *